United States Patent [19]

Miller

[11] 4,184,577

[45] Jan. 22, 1980

[54] ELECTROMAGNETIC CLUTCH WITH TWO STAGE TORQUE BUILDUP

[75] Inventor: Donald L. Miller, Horseheads, N.Y.

[73] Assignee: Facet Enterprises, Inc., Tulsa, Okla.

[21] Appl. No.: 892,239

[22] Filed: Mar. 31, 1978

[51] Int. Cl.² .............................................. F16D 27/10
[52] U.S. Cl. .................... 192/84 C; 192/52; 192/54
[58] Field of Search ................. 192/52, 54, 84 C; 188/161, 162, 163

[56] References Cited

U.S. PATENT DOCUMENTS

| | | | |
|---|---|---|---|
| 3,251,441 | 5/1966 | Winter | 192/54 X |
| 3,559,784 | 2/1971 | Miller | 192/84 C X |
| 3,584,715 | 6/1971 | Miller | 192/84 C X |
| 4,079,821 | 3/1978 | Miller | 192/84 C |

*Primary Examiner*—Allan D. Herrmann
*Attorney, Agent, or Firm*—Remy J. VanOphem

[57] ABSTRACT

An electromagnetic clutch or brake of the type having a clutch inner body with inner and outer pole faces drawn into engagement with an armature in order to establish driving engagement of the clutch. A two stage buildup of the torque is produced by an offsetting bias of the inner body pole faces by a nonmagnetic resilient ring separating the pole faces, and a shunt washer of a ferromagnetic material which serves to successively draw the pole faces into engagement with the armature by varying the reluctance through the inner and outer poles as the inner body is drawn into engagement. The resulting two stage torque buildup slows the engagement time of the clutch to thereby enable the use of rapid action torque booster clutch designs in applications requiring slower clutch action.

6 Claims, 3 Drawing Figures

ELECTROMAGNETIC CLUTCH WITH TWO STAGE TORQUE BUILDUP

BACKGROUND OF THE INVENTION

This invention concerns clutch or brake units and more particularly clutches or brakes which are electromagnetically operated.

In U.S. Pat. No. 4,079,821 there is disclosed an electromagnetically operated clutch of the type having an inner body and an armature member, the inner body having radially spaced pole faces separated by a nonmagnetic ring. The clutch includes an electromagnetic coil causing magnetic flux to pass from the inner body outer pole face, through the armature and back through the inner pole face to act to draw the inner body and armature into driving relationship to establish drive through the clutch unit.

The clutch unit disclosed in that patent features a torque booster arrangement comprising of a plurality of balls cooperating with corresponding pocket sets which serve to augment the engagement pressure by the camming action developed between the balls and the pockets upon engagement of the pole faces with the armature. The particular design of this torque boosting feature produces extremely rapid actuation of the clutch, considerably faster than other clutches of similar type.

While this may be advantageous in many applications, this rapid actuation may be required to modify in certain situations requiring a slower torque buildup. While this could be carried out electrically, this requires modification of the actuation circuitry which must then be changed from that for other conventional clutch designs which may not be a suitable alternative design option.

Accordingly, it is an object of the present invention to provide an electromagnetically operated clutch unit in which the torque buildup is delayed but which does not require a change in the external control circuit energizing the clutch unit.

It is another object of the present invention to achieve such objective in a simple, reliable manner which does not require complex additions or changes in configuration of the clutch unit.

It is yet another object of the present invention to provide such a delayed torque buildup which does not substantially affect the final torque output of the unit.

SUMMARY OF THE INVENTION

These and other objects which will become apparent upon a reading of the following specification and claims are achieved by a two stage engagement of the inner body pole faces with the armature and a corresponding two stage development of the passage of the magnetic flux from the inner body through the armature. This two stage engagement is produced by an axially offset of the inner and outer pole faces, with a resilient, nonmagnetic spacer ring and a ferromagnetic shunt washer adjacent the operator coil and in engagement with both the inner and outer poles when the clutch is in its rest or disengaged condition. Upon energization, a portion of the flux passes through the shunt washer which is thereby saturated, allowing another portion of the magnetic flux to pass through the pole faces and the armature, drawing the inner pole face into initial engagement with the armature. This decreases the reluctance through the inner body and the armature, which acts to then draw the outer pole face into engagement with the armature against the resilience of the spacer ring, and out of engagement with the shunt washer. This greatly decreases the reluctance through the inner body outer and inner pole faces and the armature, and at the same time increases the reluctance through the shunt washer to thereby develop full torque in the clutch.

DETAILED DESCRIPTION OF THE DRAWINGS

In the following detailed description, certain specific terminology will be employed for the sake of clarity in a particular embodiment described in accordance with the requirements of 35 U.S.C. 112, but it is to be understood that the same is not intended to be limiting and indeed should not be so construed, inasmuch as the invention is capable of taking many forms and variations within the scope of the appended claims. For example, the unit will be described in the context of a clutch unit in which rotary driving power is transmitted through the clutch unit upon actuation of the clutch, but it is to be understood that the same may also be similarily applied to a brake unit in which rotary member is selectively engaged with stationary structure such as to be braked. Also, the input and output members of the clutch unit are relative since either may typically, depending on the external driving connections be considered to be the input or output members.

Further, the concept, according to the present invention is special application to the particular clutch design described in the aforementioned United States patent due to the unusual rapidity with which that clutch design develops full torque, but it should be also understood that the concept according to the present invention could, in suitable applications, be applied to non-boosted clutch designs.

Figure 1:
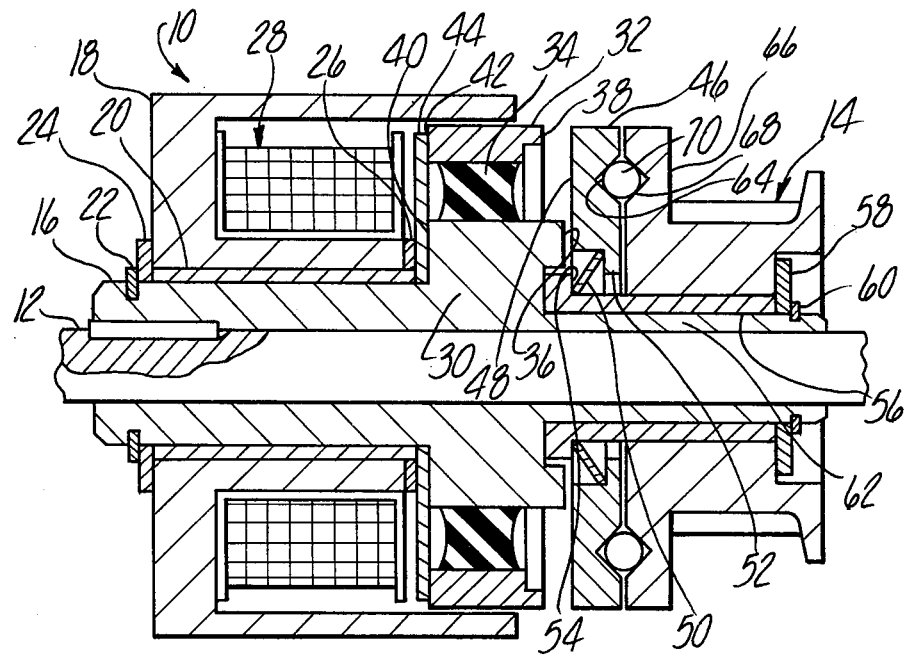
FIG. 1 is a view of a clutch brake unit according to the present invention in longitudinal section, depicting the clutch components in the initial or rest condition.

Referring to the drawings, and particularly FIG. 1, the clutch brake unit according to the present invention includes a first and second drive members here taking the form of a central shaft 12 and a pulley 14 rotatably mounted in coaxial alignment with each other. The clutch brake unit serves to controllably establish a rotative driving relationship between a first driving member and a second driving member, i.e., the shaft 12 and pulley 14.

The means for accomplishing this includes an inner body 16 coaxially mounted with respect to the clutch axis and including means for rotatably connecting together the shaft 12 and the inner body 16 by a suitable key or other mechanical connection. The inner body 16, in turn is rotatably supported on the stationary mag body 18 by means of a bearing 20, and axially positioned by means of a snap ring 22 cooperating with thrust washers 24 and 26.

The mag body 18 houses an electromagnetic operator including the electromagetic coil 28.

The inner body 16 includes a hub portion extending radially outward on which are provided inner pole 30 and outer pole 32. The outer pole 32 is joined to the inner body by a nonmagnetic spacer ring 34 secured to the inside diameter of the outer pole 32 and the outside diameter of the inner pole 30.

The spacer ring 34, according to the present invention, is formed of a resilient material such as rubber or an elastomer to provide a means to connect the inner pole and outer pole which allows limited axial displacement of the outer pole 32 with respect to the inner pole 30 for purpose to be hereinafter described. Each of the inner pole 30 and the outer pole 32 is formed with pole faces on either side thereof, each of the pole faces providing radially extending and spaced surface areas. The pole faces on the right side of the hub section of the inner body as viewed in FIG. 1 provide the clutch engagement surfaces 36 and 38 formed on the inner pole 30 and outer pole 32, respectively.

In the rest position, the pole faces 40 and 42 formed on the opposite side of the hub section of the inner body 16 are engaged with a shunt washer 44 which is adjacent the electromagnetic coil 28, and thus serves to shunt the magnetic flux which passes into the outer pole 32 and the inner pole 30 in order to produce clutch engagement as will be described.

The shunt washer is of a thickness such that for the particular electromagnetic coil 28 and the power level reached upon energization, the shunt washer 44 becomes saturated with magnetic flux, so that additional magnetic flux will continue to pass through the outer pole 32 and the inner pole 30 as will be described in further detail hereinafter.

The clutch brake unit 10 further includes a ferromagnetic armature member 46 which is mounted in alignment with the clutch axis and which has a radially extending face 48 disposed opposite the clutch engagement pole faces 36 and 38 formed on the inner pole 30 and the outer pole 32, respectively. The face 48 extends radially outward to be coextensive with the pole faces 36 and 38 such as to be adapted to come into engagement thereof upon being drawn towards the inner body by energization of the electromagnetic coil 28.

The inner body 16 and armature 46 are mounted for limited relative axial movement for this purpose. In this case, the armature 46 being mounted for axial movement against the bias of an armature return spring 50 which engages an inner shoulder 52 formed on the armature 46 and in abutment with a shoulder 54 formed on a bearing 56 which in turn serves to rotatably mount the second driving member, hub 14.

Hub 14 is additionally located axially by means of a thrust washer 58 and a snap ring 60 formed in an extension sleeve 62 integral with the inner body 16. This serves to absorb the axial reaction force created by the torque booster means associated with the clutch brake unit 10.

The torque booster means comprises the ball-pocket arrangement described in the above referenced patent, that is, the radial face of the armature 46 opposite the clutch engagement surface comprised of radial face 48 is formed with a plurality, i.e. at least three conical pockets 64. The hub 14 has a flange 66 with a radially extending face opposite the armature 46, which similarly has a corresponding set of conical pockets 68. A plurality of balls 70 are disposed, one each, in respective oppositely located pockets 64 and 68, as described in detail in the application.

The camming action between the balls 66 and the pockets 64 and 68 produces an axial force serving to increase the engagement pressure between the armature face 48 and the clutch engagement faces 36 and 38 formed on the inner pole 30 and the outer pole 32, respectively.

When the clutch brake unit is initially engaged, the relative rotation induced by the transmission of torque created by the initial engagement serves to bring the torque booster arrangement into operation to greatly increase the torque capacity of the clutch brake unit 10. As described above, this action is extremely rapid and in some applications, it may be desirable to increase the time period required to develop full torque capacity through the clutch brake unit.

This is provided according to the concept of the present invention by means mounting the radial pole face 38 formed on the outer pole 32 axially offset from the clutch engagement pole face 36 formed on the inner pole 30 when the clutch is in the rest position. That is, the spacer ring 34 is joined to the inner pole 30 and the outer pole 32 such that the clutching engagement face 38 formed on the outer pole 32 is axially offset in a direction away from the direction of relative axial movement required to bring the inner and outer pole faces 36 and 38 into engagement with the armature face 48.

Figure 2:
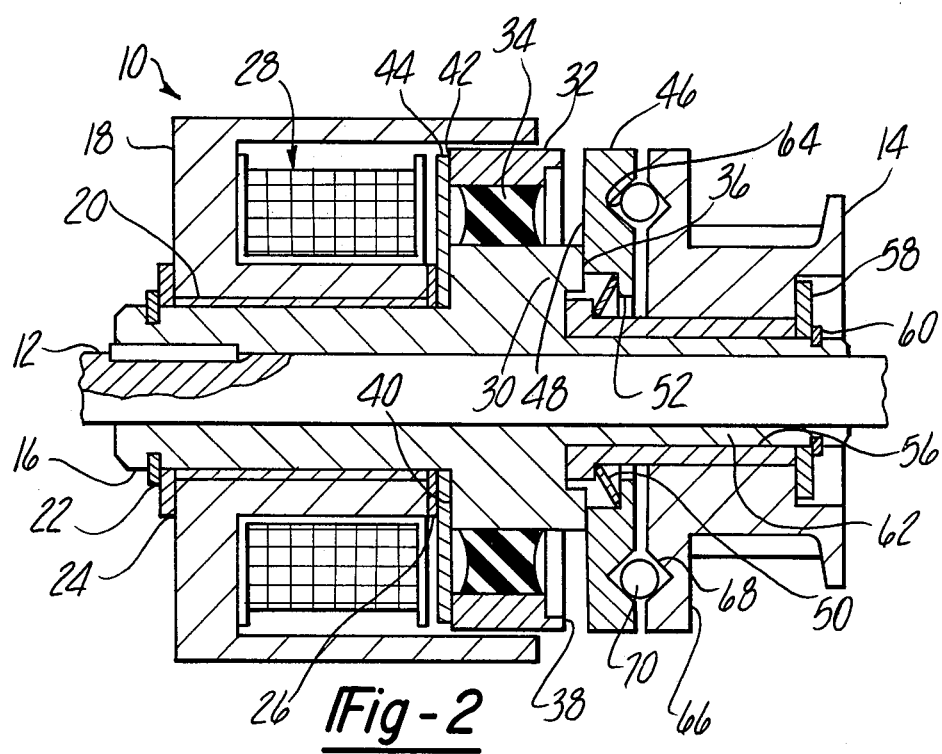
FIG. 2 is a longitudinal sectional view of the clutch unit shown in FIG. 1 depicting the components in the first stage position, upon initial energization of the clutch brake unit.

This creates a two stage action upon energization of the electromagnetic coil 28 as follows:

Initially, the magnetic flux generated by the electromagnetic coil 28 is partially shunted through the shunt washer 44; that is, the magnetic flux which would normally pass through the inner pole 30 and the outer pole 32 is instead, shunted by the shunt washer 44 being in engagement with both the inner pole 30 and outer pole 32 and offering less reluctance to the magnetic flux since it is in contact therewith. The flux is thus partially shunted through the ferromagnetic shunt washer 44. As described above, the shunt washer 44 is designed to be of a thickness such that it becomes saturated at less than the flux density generated by the electromagnetic coil 28, and a portion of the magnetic flux accordingly passes through the inner and outer poles 30 and 32 and through the armature 46, sufficient to draw the armature into engagement with the inner pole clutch face 36 as shown in FIG. 2.

Figure 3:
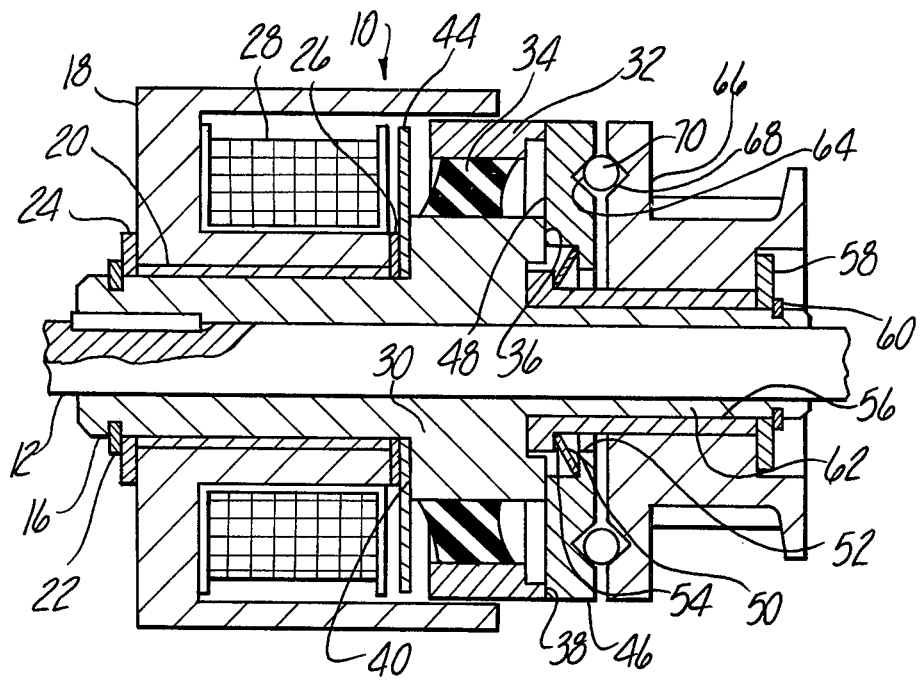
FIG. 3 shows the position of the relative position of the clutch components of the clutch units shown in FIGS. 1 and 2 in the second stage position, developing full torque through the brake unit.

At this point, the reluctance of the magnetic flux circuit through the inner pole 30 becomes reduced substantially such that the outer pole 32 begins to move axially towards the armature 46 against the bias afforded by the resilience of the spacer ring 34. This further reduces the reluctance of the magnetic flux path through the inner and outer poles 30 and 32. Upon engagement with the armature 46 and the opening of the gap between the shunt washer 44 and the face 42 on the outer pole 32, the magnetic flux passes almost entirely through the inner and outer poles 30 and 32 in the final stage of clutch engagement as shown in FIG. 3, to thus develop the full torque capacity of the clutch unit, since only a minor fraction of the magnetic flux continues to pass through the ferromagnetic shunt washer 44.

The various parameters involved would be determined by the specific design and the specifications of the particular clutch, i.e. the gap between the inner pole and outer pole, the resilience of the spacer ring 34.

It may be seen that a two stage operation is produced in a highly reliable manner by the arrangement of the clutch components, which does not necessitate any change in the control circuit for energizing electromagnetic coil 28, in which should operate in a highly reliable manner without significantly increasing the complexity or size of the clutch unit 10. Furthermore, the final torque capacity is not substantially reduced. Although the engagement pressure exerted by the balls 70 in the pockets sets 64 and 68 is slightly reduced due to the resilient mounting of the outer pole 32, this is relatively minor.

In addition, the advantages described in the U.S. Pat. No. 3,978,953 in which a resilient spacer ring is utilized in a similar manner, allowing relative axial movement of the inner and outer pole faces which, is also achieved by the present design in addition to the benefits afforded described above in producing the two stage operation. That is, the run-in required to precisely match the axial alignment of the inner and outer pole faces is eliminated and the loss of engagement of one pole face does not necessarily produce a loss of engagement of the other pole face since they may move relative each other axially. It can, thus, be appreciated that the objects of the present invention are achieved by this arrangement in a most advantageous matter.

What is claimed is:

1. An electromagnetically operated clutch-brake comprising:
    a first rotatably mounted drive member;
    a second rotatably mounted drive member, in axial alignment with said first drive member;
    a ferromagnetic inner body drivingly connected for rotation with said first drive member, said inner body including radially spaced inner and outer poles each having a radially extending pole face;
    a ferromagnetic armature member drivingly connected to said second driven member, said armature having a radial face disposed opposite and extending radially in correspondence with said inner body pole faces;
    means mounting said inner body and armature for relative axial movement into and out of engagement of said inner body pole faces;
    electromagnetic operator means for controllably causing magnetic flux to pass through said inner body pole faces and said armature to draw said inner body and armature into engagement by said relative axial movement by magnetic attraction therebetween to controllably establish a rotative driving connection between said first and second drive members;
    means mounting said inner and outer poles of said inner body in an axially offset position relative each other, said means including a connection rotatably joining said inner and outer poles allowing relative axial movement therebetween, whereby a two-stage engagement of said pole faces with said armature radial face is provided by initial engagement of said pole face nearest said armature clutch face and a subsequent engagement of said pole face remote from said clutch face, to thereby produce a delayed torque buildup in said clutch brake.

2. The clutch-brake unit according to claim 1 wherein said connection joining said inner and outer poles of said inner body comprises:
    a nonferromagnetic spacer ring connected to said inner and outer poles, said spacer ring being from a resilient material to thereby accommodate said limited axial movement.

3. The clutch-brake unit according to claim 1 further including a ferromagnetic shunt washer mounted to extend into contact with both of said inner and outer poles of said inner body at point adjacent said electromagnetic operator means when said poles are in said offset position and moving out of said contact when said inner and outer poles move into engagement with said armature radial face, whereby said shunt washer causes a portion of the magnetic flux generated by said electromagnetic means to be shunted when said inner and outer poles are in said offset position, but not shunted upon movement of said inner and outer pole faces into engagement with said armature radial face.

4. The clutch-brake according to claim 3 wherein said shunt washer is of a size producing saturation thereof by a magnetic flux less than that generated by said electromagnetic operator means, whereby only a portion thereof is shunted by said shunt washer.

5. The clutch-brake unit according to claim 1 further including torque booster means, comprised of a plurality of balls and a corresponding set of conical pockets, one set formed in said armature member, and a second pocket set in alignment therewith formed in a member axially fixed with respect to said armature, whereby said armature is urged towards said inner body pole faces by ramping action of said plurality of balls in said pockets.

6. The clutch-brake unit according to claim 5 wherein said member comprises said second drive member, and said balls constitute said means drivingly connecting said armature to said second drive member, whereby said balls carry the torque transmitted.

* * * * *